US012684565B2

(12) United States Patent
Tripathi

(10) Patent No.: US 12,684,565 B2
(45) Date of Patent: Jul. 14, 2026

(54) SYSTEM, METHOD, AND COMPUTER PROGRAM FOR DYNAMIC ALLOCATION OF UPLINK GRANT IN A NETWORK

(71) Applicant: Rakuten Mobile, Inc., Tokyo (JP)

(72) Inventor: Sandeep Mani Tripathi, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 390 days.

(21) Appl. No.: 18/271,698

(22) PCT Filed: May 30, 2023

(86) PCT No.: PCT/US2023/023822
§ 371 (c)(1),
(2) Date: Jul. 11, 2023

(87) PCT Pub. No.: WO2024/248792
PCT Pub. Date: Dec. 5, 2024

(65) Prior Publication Data
US 2024/0406953 A1     Dec. 5, 2024

(51) Int. Cl.
*H04W 72/1268* (2023.01)
(52) U.S. Cl.
CPC ............................... *H04W 72/1268* (2013.01)

(58) Field of Classification Search
CPC ............ H04W 72/1268; H04W 72/52; H04W 72/535
See application file for complete search history.

(56) References Cited

U.S. PATENT DOCUMENTS

| | | |
|---|---|---|
| 2019/0272831 A1 | 9/2019 | Kajarekar |
| 2022/0109546 A1 | 4/2022 | Panteleev et al. |
| 2023/0010010 A1* | 1/2023 | Shukla ..................... G06N 3/08 |
| 2024/0356715 A1* | 10/2024 | Kanamarlapudi .... H04L 5/0055 |

* cited by examiner

*Primary Examiner* — Kevin M Cunningham
(74) *Attorney, Agent, or Firm* — Sughrue Mion, PLLC

(57) ABSTRACT

Provided are system, method, and device for allocating time slots in a network. According to embodiments, the system may include: a memory storage storing computer-executable instructions; and at least one processor communicatively coupled to the memory storage, wherein the at least one processor may be configured to execute the instructions to: determine whether or not a signal is received; in response to determining that the signal is received, determine an amount of time between a time when the signal is received and a current time; and allocate a time slot for a time interval based on the amount of time.

17 Claims, 7 Drawing Sheets

200

500

Start

Determine whether or not a
signal is received
S510

Determine time since the
signal is received
S520

Allocate a slot for a time
interval based on the
determined time
S530

End

SYSTEM, METHOD, AND COMPUTER PROGRAM FOR DYNAMIC ALLOCATION OF UPLINK GRANT IN A NETWORK

TECHNICAL FIELD

Systems, methods, and computer programs consistent with example embodiments of the present disclosure relate to a telecommunication network, and more specifically, relate to dynamic allocation of uplink grant in a telecommunication network.

BACKGROUND

Scheduling in a telecommunication network may refer to a process where a base station schedules and allocates time slots for uplink (UL) grant for users within the network. Scheduling and allocating time slots for UL grant is an important process in a telecommunication network, as it allows the network to reserve time slots for the user's user equipment (UE) to transmit data to the base station. It can be understood that scheduling may be performed by at least one processor of a base station in communication with a user equipment within a telecommunication network.

In the related art, the base station must first receive a Scheduling Request (SR) signal from the UE or any other suitable device. Once the base station receives the SR signal from the UE, the base station allocates a time slot for transmitting a grant for uplink (UL) to the UE, via a downlink (DL) signal. The UE may then transmit data to the base station via the UL, in accordance with the allocated time slot.

Nevertheless, the above approach for scheduling in the related art may have at least the following shortcomings. Since the base station is required to wait for the UE to transmit the SR signal before beginning to schedule allocation of time slots, the user may have to wait for a certain amount of time before receiving the grant of UL.

In order to reduce the amount of time before the user can receive the grant of UL, prescheduling may be used in the related art.

FIG. 1 illustrates an example of prescheduling in the related art. Prescheduling may refer to a technique where, once the base station receives a first SR signal from the UE and allocates a first time slot for transmitting a grant for UL, the base station continues to allocate additional time slots for transmitting a grant for UL in advance, without waiting for a subsequent SR signal. This may allow the user to utilize the time slots that has already been allocated by the base station in a timely manner, thereby reducing the wait time and latency.

The additional time slots may be allocated for a certain time interval over a certain time duration. Referring to FIG. 1, once the base station receives a first SR signal from the UE and allocates a first time slot for transmitting a grant for UL at time slot 2, the base station continues to allocate additional time slots for transmitting a grant for UL at an interval of 4 time slots over a time duration of 20 time slots. In response to such grant, the user equipment may then transmit data to the base station via the UL.

Nevertheless, the above approaches for prescheduling in the related art may have at least the following shortcomings. In the related are, the amount of time for the time interval and for the time duration of the allocated time slots are predetermined and are static. As such, if the UE does not utilize the granted UL and does not transmit data to the base station during this time duration, the allocated time slots may be wasted and overall cell throughput may be reduced.

Further, having unutilized allocated time slots unnecessarily increases the risks of cross-link interferences. Cross-link interferences may refer to interferences that are caused in a network utilizing the time division duplexing (TDD), where one base station is incidentally transmitting data on a particular frequency band that another base station is receiving data on during the same time slots. In this regard, having unutilized allocated time slots may result in more base station being in the state of receiving data than necessary, which increases the risks of cross-link interferences.

Furthermore, having unutilized allocated time slots unnecessarily reduces the battery life of the UE. Specifically, when a grant of UL is received by the UE but the UE does not yet have any UL data, the UE would transmit packets of padding back to the base station. Such transmission reduces the battery life of the UE.

SUMMARY

Example embodiments of the present disclosure automatically and dynamically allocate time slots for the UE, based on the amount of time since the last transmission from the UE. As such, example embodiments of the present disclosure improve efficiency, cell throughput, uplink performance, and battery life, as well as reduce interferences.

According to embodiments, a system is provided. The system may include: a memory storage storing computer-executable instructions; and at least one processor communicatively coupled to the memory storage, wherein the at least one processor may be configured to execute the instructions to: determine whether or not a signal is received; in response to determining that the signal is received, determine an amount of time between a time when the signal is received and a current time; and allocate a time slot for a time interval based on the amount of time.

According to embodiments, a method is provided. The method may include: determining whether or not a signal is received; in response to determining that the signal is received, determining an amount of time between a time when the signal is received and a current time; and allocating a time slot for a time interval based on the amount of time.

According to embodiments, a non-transitory computer-readable recording medium is provided. The non-transitory computer-readable recording medium may have recorded thereon instructions executable by at least one processor of a system to cause the at least one processor to perform a method including: determining whether or not a signal is received; in response to determining that the signal is received, determining an amount of time between a time when the signal is received and a current time; and allocating a time slot for a time interval based on the amount of time.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
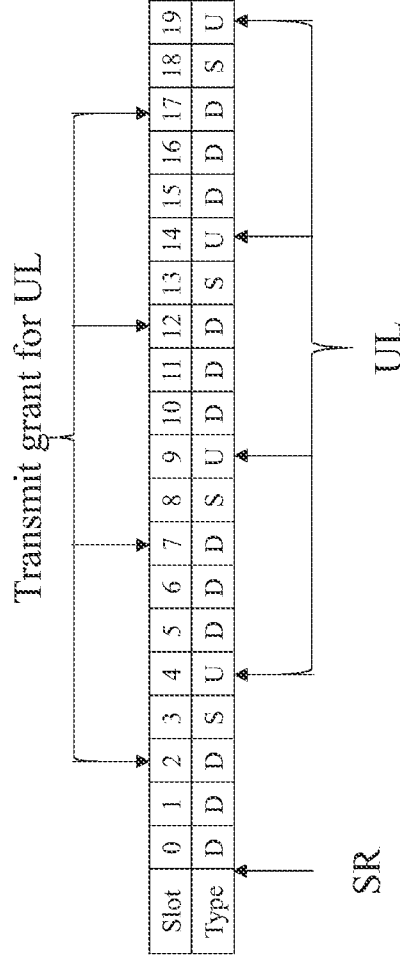
FIG. 1 illustrates an example of prescheduling in the related art.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Systems, methods, devices, and the like, provided in the example embodiments of the present disclosure dynamically allocate time slots based on the amount of time that has passed since the user last transmitted a signal.

According to embodiments, the system may determine an amount of time that has passed since the user last transmitted a signal, and may allocate a time slot for a time interval based on such amount of time. For instance, based on determining that the amount of time exceeds at least one time threshold, the time interval may be increased by an amount.

Ultimately, example embodiments of the present disclosure automatically and dynamically allocate a time slot for a time interval based on the amount of time that has passed since the user last transmitted a signal, improves efficiency, cell throughput, uplink performance, and battery life, as well as reducing interferences.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the threshold tuning system of the present disclosure, according to one or more embodiments, are provided in the following.

Example System Architecture

Figure 2:
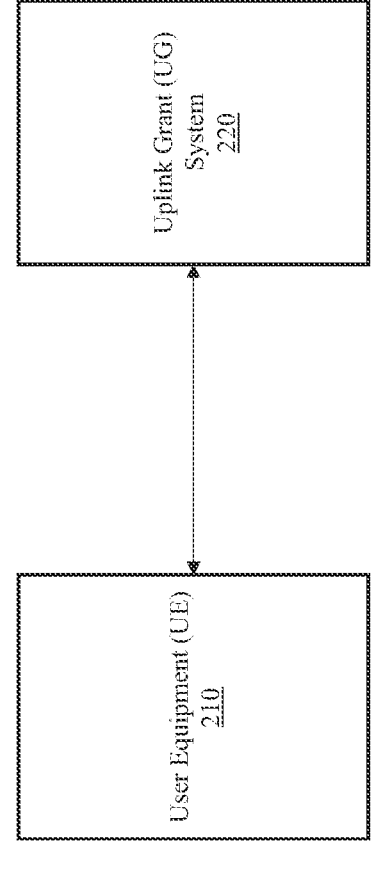
FIG. 2 illustrates a block diagram of an example system configuration for allocating time slots in a network, according to one or more embodiments.

FIG. 2 illustrates a block diagram of an example system configuration 200 for allocating time slots in a network, according to one or more embodiments. As illustrated in FIG. 2, system configuration 200 may include a user equipment (UE) 210 and an Uplink Grant (UG) system 220.

UE 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), a SIM-based device, or a similar device. UE 210 may be communicatively coupled to the UG system 220. In some implementations, UE 210 may transmit UL data to the UG system 220 and receive DL data from the UG system 220.

UG system 220 may include a system, a platform, a module, or the like, which may be configured to perform one or more operations or actions for allocating time slots for grant of UL in a network. According to embodiments, the UG system 220 may include a base station.

Example operations performable by the UG system 220 for allocating time slots are described below with reference to FIG. 5 to FIG. 6. Further, several example components which may be included in the UG system 220, according to one or more embodiments, are described below with reference to FIG. 3.

Figure 3:
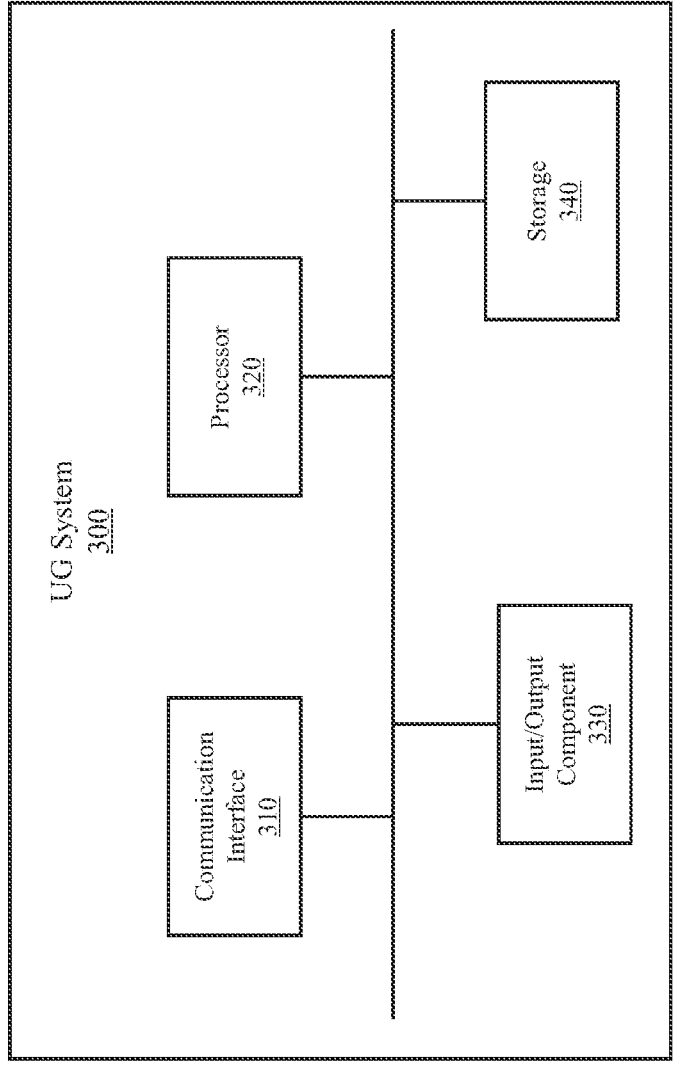
FIG. 3 illustrates a block diagram of example components in an Uplink Grant (UG) system, according to one or more embodiments.

FIG. 3 illustrates a block diagram of example components in a UG system 300, according to one or more embodiments. The UG system 300 may correspond to the UG system 220 in FIG. 2, thus the features associated with the UG system 220 and the UG system 300 may be similarly applicable to each other, unless being explicitly described otherwise.

As illustrated in FIG. 3, the UG system 300 may include at least one communication interface 310, at least one processor 320, at least one input/output component 330, and at least one storage 340, although it can be understood that the UG system 300 may include more or less components than as illustrated in FIG. 3, and/or may be arranged in a manner different from as illustrated in FIG. 3, without departing from the scope of the present disclosure.

The communication interface 310 may include at least one transceiver-like component (e.g., a transceiver, a separate receiver and transmitter, a bus, etc.) that enables the components of the UG system 300 to communicate with each other and/or to communicate with one or more components external to the UG system 300, such as via a wired connection, a wireless connection, or a combination of wired and wireless connections.

For instance, the communication interface 310 may couple the processor 320 to the storage 340 to thereby enable them to communicate and to interoperate with each other in performing one or more operations. As another example, communication interface 310 may couple the UG system 300 (or one or more components included therein) to the UE 210, so as to enable them to communicate and to interoperate with each other.

According to one or more embodiments, the communication interface 310 may include one or more application programming interfaces (APIs) which allow the UG system 300 (or one or more components included therein) to communicate with one or more software applications (e.g., software application deployed in the UE 210, etc.).

The input/output component 330 may include at least one component that permits the UG system 300 to receive information and/or to provide output information. It can be understood that, in some embodiments, the input/output component 330 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The storage 340 may include one or more storage mediums suitable for storing data, information, and/or computer-executable instructions therein. According to embodiments, the storage 340 may include at least one memory storage, such as a random access memory (RAM), a read only memory (ROM), and/or another type of dynamic or static storage device (e.g., a flash memory, a magnetic memory, and/or an optical memory) that stores information and/or instructions for use by the processor 320. Additionally or alternatively, the storage 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 340 may be configured to store information, such as raw data, metadata, or the like, obtained from UE 210. Additionally or alternatively, the storage 340 may be configured to store one or more information associated with one or more operations performed by the processor 320. For instance, the storage 340 may store information defining the historical operation(s) performed by the processor 320 to allocate time slots, one or more results of operations performed by the processor 320, or the like. Further, the storage 340 may store data or information required in allocating the time slots. For instance, the storage 340 may store at least one time thresholds (described below with reference to FIG. 4).

In some implementation, the storage 340 may include a plurality of storage mediums, and the storage 340 may be configured to store a duplicate or a copy of at least a portion of the information in the plurality of storage mediums, for providing redundancy and for backing-up the information or the associated data. Furthermore, the storage 340 may also store computer-readable or computer-executable instructions which, when being executed by one or more processors (e.g., processor 320), causes the one or more processors to perform one or more actions/operations described herein.

The processor 320 may include at least one processor capable of being programmed or being configured to perform a function(s) or an operation(s) described herein. For instance, the processor 320 may be configured to execute computer-executable instructions stored in at least one storage medium or a memory storage (e.g., storage 340, etc.) to thereby perform one or more actions or one or more operations described herein.

According to embodiments, the processor 320 may be configured to receive (e.g., via the communication interface 310, via the input/output component 330, etc.) one or more signals and/or one or more user inputs defining one or more instructions for performing one or more operations. Further, the processor 320 may be implemented in hardware, firmware, or a combination of hardware and software. For instance, processor 320 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 320 may be configured to collect, to extract, and/or to receive one or more information (in the form of signal or data, etc.) from the UE 210, and to process the received one or more information to thereby allocate time slots.

Descriptions of several example operations which may be performed by the processor 320 are provided below with reference to FIG. 5 to FIG. 6.

Example of Prescheduling in the Present Disclosure

Figure 4:
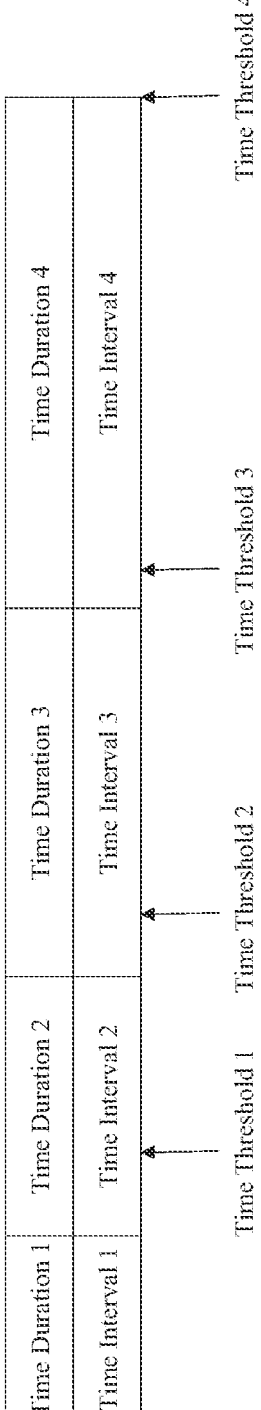
FIG. 4 illustrates an example of prescheduling, according to one or more embodiments.

FIG. 4 illustrates prescheduling according to one or more embodiments, which allows for time slots to be dynamically allocated based on the amount of time that has passed since the UE last transmitted a signal.

As illustrated in FIG. 4, the prescheduling in the present disclosure may divide the time duration for the allocated time slots into a plurality of time durations. Each of the plurality of time durations may specify a time threshold at the end of each of the plurality of time durations. For example, as shown in FIG. 4, the time duration for the allocated time slots may be divided into 4-time durations with 4-time thresholds at the end of each of the 4-time durations.

Each of the plurality of time durations may correspond to a time interval of a plurality of time intervals. For example, as shown in FIG. 4, the time duration for the allocated time slots may be divided into 4-time durations corresponding to 4-time intervals: duration 1 corresponding to interval 1, duration 2 corresponding to interval 2, duration 3 corresponding to interval 3, and duration 4 corresponding to interval 4.

As also shown in FIG. 4, each time duration may be followed by a subsequent time duration, where each of a subsequent time duration may be longer than a current (previous) time duration and each of a subsequent time interval may be longer than a current (previous) time interval. For example, as shown in FIG. 4, the fourth time interval and duration may be longer than the third time interval and duration, and the third time interval and duration may be longer than the second time interval and duration, etc.

Consequently, each subsequent time threshold may specify a time period (i.e., time since the UE last transmitted a signal) that is longer than a double of a time period specified by a previous time threshold. For example, if time duration 1 is 10 ms and time duration 2 is 20 ms, then the time threshold 1 may be 10 ms and time duration 2 may be 30 ms.

It can be understood that the configuration illustrated in FIG. 4 is simplified for descriptive purpose, and is not intended to limit the scope of the present disclosure in any way. Specifically, in practice, the number of time durations (the number of time thresholds), the time of each time duration (the time period specified by each time threshold), and the amount that the time interval increases may be any number and can be predetermined or preconfigured by one or more users (e.g., user(s) from a network operator, etc.). Further, it can be understood that the above values may be adjusted manually by the user(s), may be adjusted automatically by the system, and/or the like, when required.

This configuration may allow the time interval for the allocation of the time slots to progressively increases as the amount of time since the UE last transmitted a signal increases. As a result, the amount of time slots allocated to the UE can be reduced proportional to the amount of time that the UE is not utilizing the allocated time slots. Subsequently, time slots can be allocated for use in other applications, thereby reducing the amount of unutilized allocated time slots, as well as improving efficiency, cell throughput, and uplink performance.

Further, since the amount of unutilized allocated time slots reduces, the amount of times that the UE transmits packets of padding also reduces, which improves the battery life. Similarly, since the amount of unutilized allocated time slots reduces, the amount of times that the base station is in the state of receiving data also reduces, which reduces the risks of cross-link interferences.

Example Operations for Prescheduling in the Present Disclosure

In the following, several example operations performable by the UG system of the present disclosure are described with reference to FIG. 5 to FIG. 6. It can be understood that the example operations performable by the UG system of the present disclosure can be performed under time division duplexing (TDD) or frequency division duplexing (FDD).

Figure 5:
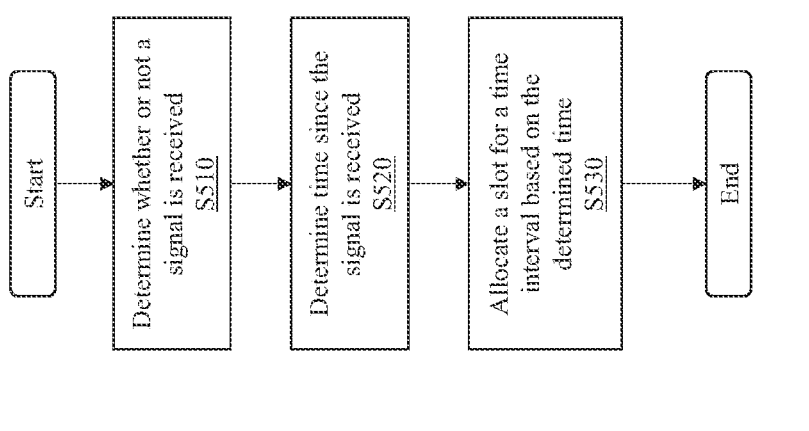
FIG. 5 illustrates a flow diagram of an example method for prescheduling, according to one or more embodiments.

FIG. 5 illustrates a flow diagram of an example method 500 for prescheduling, according to one or more embodiments. One or more operations in method 500 may be performed by at least one processor (e.g., processor 320) of the UG system.

As illustrated in FIG. 5, at operation S510, the at least one processor may be configured to determine whether or not a signal is received. According to embodiments, the signal may be a signal that may indicate that the user may request a grant for UL. Such signal may be one of a DL data received at a gNodeB, a Scheduling Request, a UL data, and the like.

As illustrated in FIG. 5, at operation S520, the at least one processor may be configured to determine an amount of time since the signal is received. For example, the at least one processor may determine an amount of time between a time when the signal is received and a current time. Additionally or alternatively, the at least one processor may start a timer at the time when the signal is received and may keep track of said timer.

Referring still to FIG. 5, at operation S530, the at least one processor may be configured to allocate a time slot for a time interval based on the time determined at operation S520. For example, the at least one processor may allocate a time slot for a certain time interval, and then increase the time interval as the time determined at operation S520 increases. Examples of operations for allocating a time slot are described below with reference to FIG. 6.

Upon performing operation S530, the method 500 may be ended or be terminated. Alternatively, method 500 may return to operation S520, such that the at least one processor may be configured to repeatedly perform, for at least a predetermined amount of time, the determining an amount of time since the signal is received (at operation S520) and the allocating of a time slot for a time interval (at operation S530). For instance, the at least one processor may continuously (or periodically) receive signals from the user, and then restart the determining an amount of time since the signal is received (at operation S520) and the allocating of a time slot for a time interval (at operation S530).

To this end, the system of the present disclosure may allocate time slots based on the amount of time that has passed since the signal is received.

Example Operations for Allocating a Time Slot in the Present Disclosure

In the following several example operations performable by the at least one processor for allocating a time slot are described with reference to FIG. 6.

Figure 6:
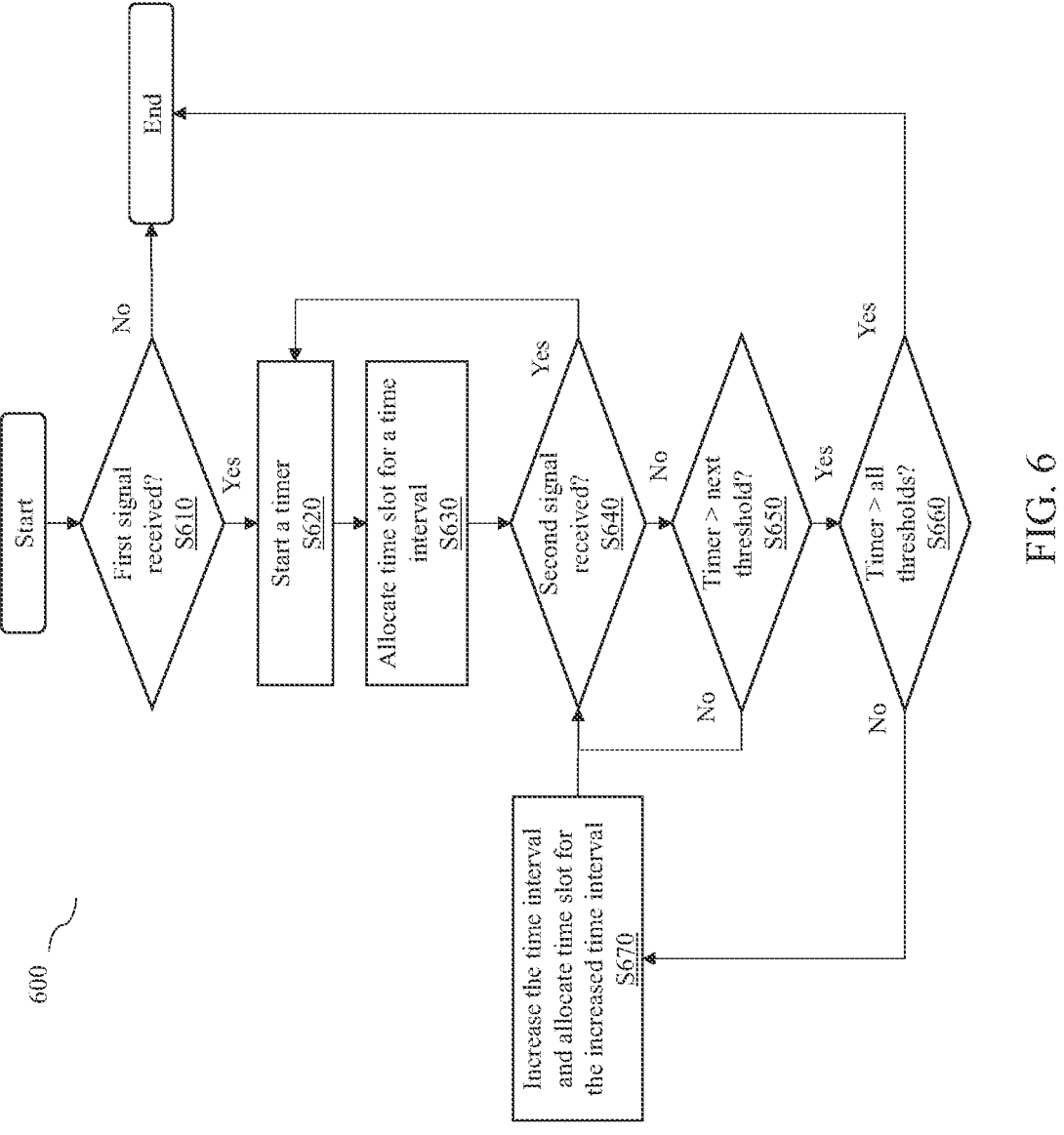
FIG. 6 illustrates a flow diagram of an example method for allocating a time slot, according to one or more embodiments.

FIG. 6 illustrates a flow diagram of an example method 600 for allocating a time slot, according to one or more embodiments. One or more operations of method 600 may be part of operation S510, S520, and/or S530 in method 500, and may be performed by at least one processor (e.g., processor 320) of the UG system.

As illustrated in FIG. 6, at operation S610, the at least one processor may be configured to determine whether or not prescheduling should be performed, by determining whether or not a first signal is received. The first signal may indicate that the UE is requesting resources. Such first signal may be a Scheduling Request and the like.

Accordingly, based on determining that the first signal is not received, the at least one processor may determine that prescheduling should not be performed, and proceeds to end prescheduling. On the other hand, based on determining that the first signal is received, the at least one processor may determine that prescheduling should be performed, and proceeds to operation S620 to begin prescheduling.

At operation S620, the at least one processor may be configured to determine an amount of time since the first signal is received, by starting a timer. For example, the timer may specify the amount of time between a time when the first signal is received and a current time.

At operation S630, the at least one processor may be configured to allocate a time slot for a time interval. The method then proceeds to operation S640.

At operation S640, the at least one processor may be configured to determine whether or not the user is utilizing the allocated time slot. For example, the at least one processor may be configured to determine whether or not a second signal is received. The second signal may indicate that the user transmitting data to the UG system. The second signal may be one of a DL data received at a gNodeB, a UL data, and/or the like.

Accordingly, based on determining that the second signal is not received, the at least one processor may determine that the user is not utilizing the allocated time slot, and proceeds to operation S650. On the other hand, based on determining that the second signal is received, the at least one processor may determine that the user is utilizing the allocated time slot, and returns to operation S620 to restart the timer and the allocation of time slot for a time interval.

At operation S650, the at least one processor may be configured to determine whether or not the user is not utilizing the allocated time slot for too long, by determining whether or not the timer has exceeded the next time threshold. The next time threshold may refer to one of a plurality of time thresholds that has not yet been exceeded, and may specify the end of the current time duration. For example, referring to the example in FIG. 2, if the current time is within duration 1, then the at least one processor may be configured to determine whether or not the timer has exceeded the time threshold 1.

Accordingly, based on determining that the timer has exceeded the next time threshold, the at least one processor may determine that the user is not utilizing the allocated time slot for too long, and proceeds to proceeds to operation S660. On the other hand, based on determining that the timer has not yet exceeded the next time threshold, the at least one processor may determine that the user might still be utilizing the allocated time slot, and returns to operation S640 to continue to check for the second signal.

At operation S660, the at least one processor may be configured to determine whether or not the user has stopped utilizing the allocated time slot, by determining whether or not the timer has exceeded all time thresholds of the plurality of time thresholds. For example, referring to the example in FIG. 2, the at least one processor may be configured to determine whether or not the timer has exceeded all time threshold 1 to time threshold 4.

Accordingly, based on determining that the timer has exceeded all time thresholds, the at least one processor may determine that the user has stopped utilizing the allocated time slot, and proceeds to end the prescheduling. On the other hand, based on determining that the timer has not yet exceeded all time thresholds, the at least one processor may determine that the user might not have stopped utilizing the allocated time slot, and proceeds to operation S670.

At operation S670, the at least one processor may be configured to increase the time interval by an amount, and then allocate the time slot for the increased time interval. For example, referring to the example in FIG. 2, if the at least one processor determined that the timer has exceeded the time threshold 1 at operation S650, then the at least one processor may be configured to increase the time interval by an amount such that the time interval corresponds to time interval 2.

After operation S670, the method returns to operations S640, S650, and then S660 and repeat said operations, in order to continue to increase the time interval as the amount of time increases to exceed each time thresholds of the plurality of time thresholds. The method repeats the above operation (including operations S620 and S630 if the at least one processor determines that the second signal is received at operation S640) until the at least one processor determines that the timer has exceeded all time thresholds of the plurality of time thresholds at operation S660; where the method proceeds to end the prescheduling.

Example Implementation Environment

Figure 7:
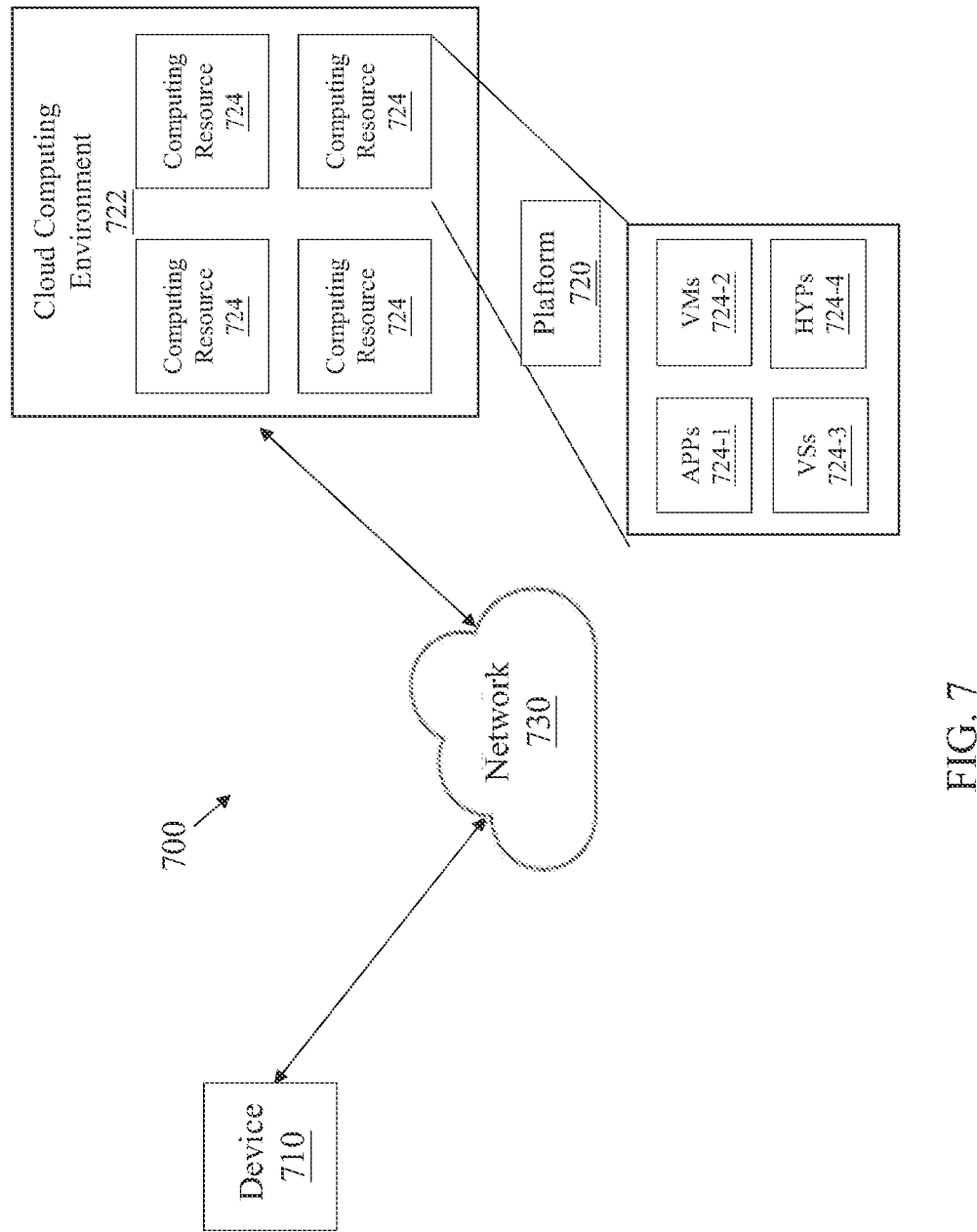

FIG. 7 illustrates a diagram of an example environment 700 in which systems and/or methods, described herein, may be implemented. As shown in FIG. 7, environment 700 may include a device 710, a platform 720, and a network 730. Devices of environment 700 may interconnect via wired connections, wireless connections, or a combination of wired and wireless connections. In some embodiments, any of the functions and operations described with reference to FIG. 2 to FIG. 6 above may be performed by any combination of elements illustrated in FIG. 7.

According to embodiments, the UG system described herein may be stored, hosted, or deployed in the cloud computing platform 720. In this regard, device 710 may include a device, system, equipment, or the like, utilized by the user (e.g., user of a marketing team, user of a network planning team, etc.) to access the UG system. In that case, device 710 may include one or more devices capable of receiving, generating, storing, processing, and/or providing information associated with platform 720. According to embodiments, device 710 may be UE 210 in FIG. 2.

Platform 720 includes one or more devices capable of receiving, generating, storing, processing, and/or providing information. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 may not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc. services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, a cluster of computing devices, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like.

Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program, and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 may include one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Various Aspects of Embodiments

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s) module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Various further respective aspects and features of embodiments of the present disclosure may be defined by the following items:

Item [1]: A system that may include: a memory storage storing computer-executable instructions; and at least one processor communicatively coupled to the memory storage, wherein the at least one processor may be configured to execute the instructions to: determine whether or not a signal is received; in response to determining that the signal is received, determine an amount of time between a time when the signal is received and a current time; and allocate a time slot for a time interval based on the amount of time.

Item [2]: The system according to item [1], wherein the at least one processor may be configured to execute the instructions to allocate the time slot by: increase the time interval as the amount of time increases.

Item [3]: The system according to any one of items [1]-[2], wherein the at least one processor may be configured to execute the instructions to allocate the time slot by: in response to determining that the amount of time exceeds at least one time threshold, increase the time interval by an amount, wherein the time interval may be increased at a time when the amount of time exceeds the at least one time threshold.

Item [4]: The system according to item [3], wherein the at least one time threshold may be a plurality of time thresholds, wherein each subsequent time threshold of the plurality of time thresholds may specify a time period that is longer than a double of a time period specified by a previous time threshold of the plurality of time thresholds; and wherein the time interval may be increased at a time when the amount of time exceeds each time threshold of the plurality of time thresholds.

Item [5]: The system according to item [4], wherein the at least one processor may be configured to execute the instructions to allocate the time slot by: in response to determining that the amount of time exceeds all time threshold of the plurality of time thresholds, terminate allocation of the time slot.

Item [6]: The system according to item [4], wherein a number of time thresholds in the plurality of time thresholds, the time period specified by each time threshold of the plurality of time thresholds, and the amount that the time interval increase may be predetermined.

Item [7]: The system according to any one of items [1]-[6], wherein the signal may include at least one of an uplink data, a downlink data, and a Scheduling Request signal.

Item [8]: A method that may include: determining whether or not a signal is received; in response to determining that the signal is received, determining an amount of time between a time when the signal is received and a current time; and allocating a time slot for a time interval based on the amount of time.

Item [9]: The method according to item [8], wherein the allocating the time slot may include: increasing the time interval as the amount of time increases.

Item [10]: The method according to any one of items [8]-[9], wherein the allocating the time slot may include: in response to determining that the amount of time exceeds at least one time threshold, increasing the time interval by an amount, wherein the time interval may be increased at a time when the amount of time exceeds the at least one time threshold.

Item [11]: The method according to item [10], wherein the at least one time threshold may be a plurality of time thresholds, wherein each subsequent time threshold of the plurality of time thresholds may specify a time period that is longer than a double of a time period specified by a previous time threshold of the plurality of time thresholds; and wherein the time interval may be increased at a time when the amount of time exceeds each time threshold of the plurality of time thresholds.

Item [12]: The method according to item [11], wherein the allocating the time slot may include: in response to determining that the amount of time exceeds all time threshold of the plurality of time thresholds, terminating allocation of the time slot.

Item [13]: The method according to item [11], wherein a number of time thresholds in the plurality of time thresholds, the time period specified by each time threshold of the plurality of time thresholds, and the amount that the time interval increase may be predetermined.

Item [14]: The method according to any one of items [8]-[13], wherein the signal may include at least one of an uplink data, a downlink data, and a Scheduling Request signal.

Item [15]: A non-transitory computer-readable recording medium that may have recorded thereon instructions executable by at least one processor of a system to cause the at least one processor to perform a method including: determining whether or not a signal is received; in response to determining that the signal is received, determining an amount of time between a time when the signal is received and a current time; and allocating a time slot for a time interval based on the amount of time.

Item [16]: The non-transitory computer-readable recording medium according to item [15], wherein the allocating the time slot may include: increase the time interval as the amount of time increases.

Item [17]: The non-transitory computer-readable recording medium according to any one of items [15]-[16], wherein the allocating the time slot may include: in response to determining that the amount of time exceeds at least one time threshold, increasing the time interval by an amount, wherein the time interval may be increased at a time when the amount of time exceeds the at least one time threshold.

Item [18]: The non-transitory computer-readable recording medium according to item [17], wherein the at least one time threshold may be a plurality of time thresholds, wherein each subsequent time threshold of the plurality of time thresholds may specify a time period that is longer than a double of a time period specified by a previous time threshold of the plurality of time thresholds; and wherein the time interval may be increased at a time when the amount of time exceeds each time threshold of the plurality of time thresholds.

Item [19]: The non-transitory computer-readable recording medium according to item [18], wherein the allocating the time slot may include: in response to determining that the amount of time exceeds all time threshold of the plurality of time thresholds, terminating allocation of the time slot.

Item [20]: The non-transitory computer-readable recording medium according to item [18], wherein a number of time thresholds in the plurality of time thresholds, the time period specified by each time threshold of the plurality of time thresholds, and the amount that the time interval increase may be predetermined.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:
a memory storage storing computer-executable instructions; and
at least one processor communicatively coupled to the memory storage, wherein the at least one processor is configured to execute the instructions to:
determine whether or not a signal is received;
in response to determining that the signal is received, determine an amount of time between a time when the signal is received and a current time; and
allocate a time slot for a time interval based on the amount of time,
wherein the at least one processor is configured to execute the instructions to allocate the time slot by, in response to determining that the amount of time exceeds at least one time threshold, increasing the time interval by an amount,
wherein the at least one time threshold is a plurality of time thresholds, and
wherein each subsequent time threshold of the plurality of time thresholds specifies a time period that is longer than a double of a time period specified by a previous time threshold of the plurality of time thresholds.

2. The system according to claim 1, wherein the at least one processor is configured to execute the instructions to allocate the time slot by increasing the time interval as the amount of time increases.

3. The system according to claim 1, wherein:
the time interval is increased at a time when the amount of time exceeds each time threshold of the plurality of time thresholds.

4. The system according to claim 3, wherein the at least one processor is configured to execute the instructions to allocate the time slot by, in response to determining that the amount of time exceeds all time thresholds of the plurality of time thresholds, terminating allocation of the time slot.

5. The system according to claim 3, wherein a number of time thresholds in the plurality of time thresholds, the time period specified by each time threshold of the plurality of time thresholds, and the amount that the time interval increase are predetermined.

6. The system according to claim 1, wherein the signal includes at least one of an uplink data, a downlink data, and a Scheduling Request signal.

7. A method, comprising:

determining whether or not a signal is received;

in response to determining that the signal is received, determining an amount of time between a time when the signal is received and a current time; and allocating a time slot for a time interval based on the amount of time, wherein the allocating the time slot comprises: in response to determining that the amount of time exceeds at least one time threshold, increasing the time interval by an amount, wherein the at least one time threshold is a plurality of time thresholds, and wherein each subsequent time threshold of the plurality of time thresholds specifies a time period that is longer than a double of a time period specified by a previous time threshold of the plurality of time thresholds.

8. The method according to claim 7, wherein the allocating the time slot comprises: increasing the time interval as the amount of time increases.

9. The method according to claim 7, wherein:

the time interval is increased at a time when the amount of time exceeds each time threshold of the plurality of time thresholds.

10. The method according to claim 9, wherein the allocating the time slot comprises: in response to determining that the amount of time exceeds all time thresholds of the plurality of time thresholds, terminating allocation of the time slot.

11. The method according to claim 9, wherein a number of time thresholds in the plurality of time thresholds, the time period specified by each time threshold of the plurality of time thresholds, and the amount that the time interval increase are predetermined.

12. The method according to claim 7, wherein the signal includes at least one of an uplink data, a downlink data, and a Scheduling Request signal.

13. A non-transitory computer-readable recording medium having recorded thereon instructions executable by at least one processor to cause the at least one processor to perform a method comprising:

determining whether or not a signal is received;

in response to determining that the signal is received, determining an amount of time between a time when the signal is received and a current time; and allocating a time slot for a time interval based on the amount of time, wherein the allocating the time slot comprises, in response to determining that the amount of time exceeds at least one time threshold, increasing the time interval by an amount, wherein the at least one time threshold is a plurality of time thresholds, and wherein each subsequent time threshold of the plurality of time thresholds specifies a time period that is longer than a double of a time period specified by a previous time threshold of the plurality of time thresholds.

14. The non-transitory computer-readable recording medium according to claim 13, wherein the allocating the time slot comprises: increasing the time interval as the amount of time increases.

15. The non-transitory computer-readable recording medium according to claim 13, wherein:

the time interval is increased at a time when the amount of time exceeds each time threshold of the plurality of time thresholds.

16. The non-transitory computer-readable recording medium according to claim 15, wherein the allocating the time slot comprises: in response to determining that the amount of time exceeds all time thresholds of the plurality of time thresholds, terminating allocation of the time slot.

17. The non-transitory computer-readable recording medium according to claim 15, wherein a number of time thresholds in the plurality of time thresholds, the time period specified by each time threshold of the plurality of time thresholds, and the amount that the time interval increase are predetermined.

* * * * *